Patented Feb. 26, 1924.

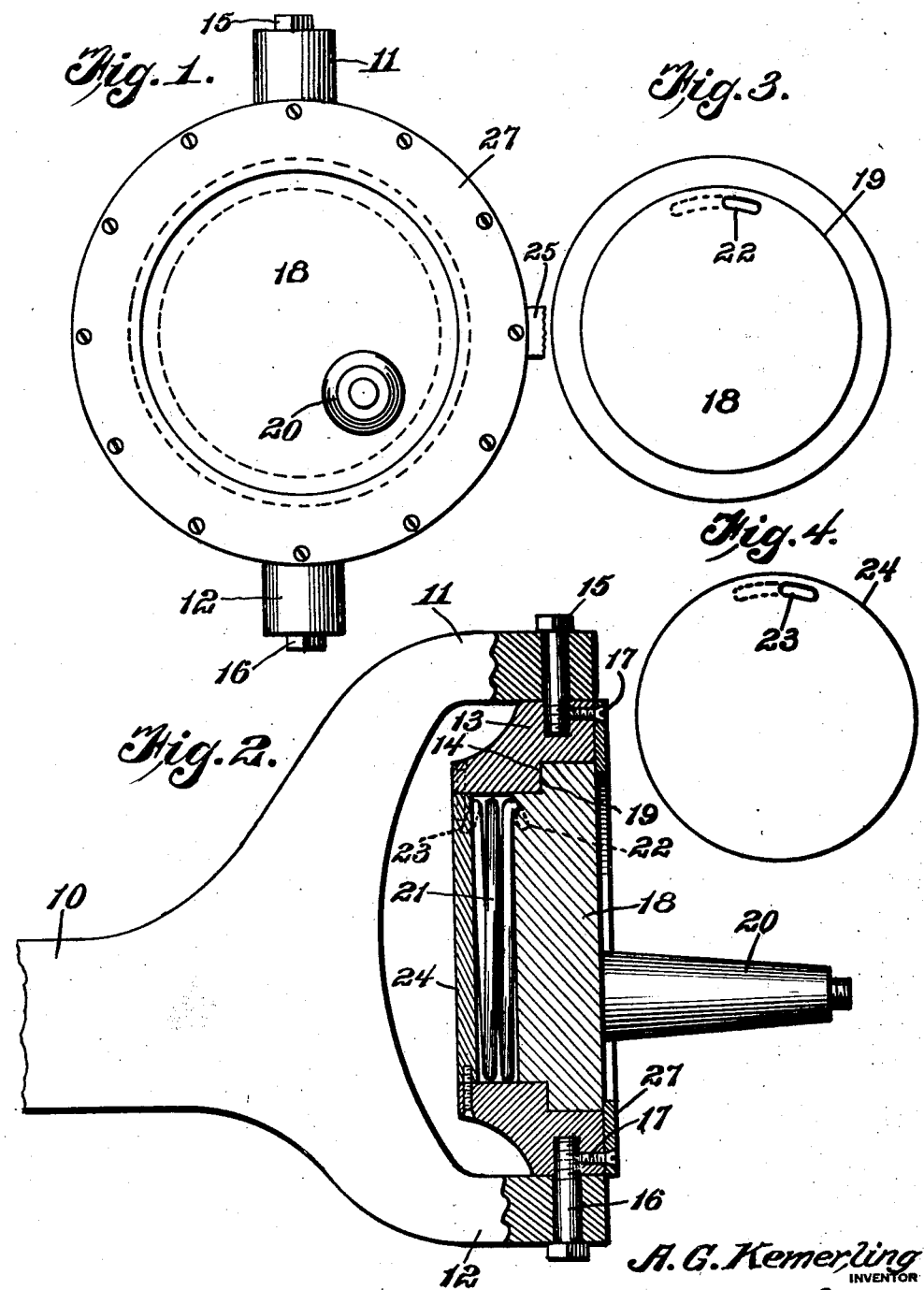

1,485,271

UNITED STATES PATENT OFFICE.

ALEXANDER G. KEMERLING, OF CELINA, OHIO, ASSIGNOR OF ONE-HALF TO ISRAEL F. RAUDABAUGH, OF CELINA, OHIO.

SHOCK ABSORBER.

Application filed August 5, 1922, Serial No. 579,826. Renewed October 19, 1923.

*To all whom it may concern:*

Be it known that I, ALEXANDER G. KEMERLING, a citizen of the United States, residing at Celina, in the county of Mercer and State of Ohio, have invented new and useful Improvements in Shock Absorbers, of which the following is a specification.

The object of this invention is to provide for mounting a shock absorber within each fork of the front axle of a motor car, the wheel spindle being carried by one element of the shock absorbing device.

A further object is to provide a plurality of annular elements, one of which is retained in a stationary position within the fork, the others being movable with reference to the stationary element and acting to place a coiled spring under tension.

A still further object is to provide a device of this type, comprising a ring member to be mounted in a stationary position in the fork, and designed to receive a disk carrying the wheel spindle, and also receive a second disk, a coiled spring being positioned between the disks and placed alternately under tension and being allowed to relax, for the purpose of taking up shocks due to vibration and the like.

In the drawings, Figure 1 is a view of the device in elevation, looking toward the forked end of an axle; Figure 2 is a vertical section through the structure of Figure 1, approximately in a plane coincident with the side of the axle; Figures 3 and 4 show the disk elements 18 and 24, between which the spring of Figure 2 is mounted.

With the foregoing and other objects in view, the invention consists in the novel construction and arrangement of elements described, illustrated and claimed, it being understood that modifications may be made within the scope of the claims without departing from the spirit of the invention.

The axle 10 includes the spaced members 11 and 12 providing a fork of about the usual construction, and in fact it is the intention that the device shall be capable of application to the forked axle of any car.

A ring, or annular member 13 constitutes a casing and is provided with an annular shoulder 14. This device 13 is held in position in the fork by means of stud bolts 15 and 16 which pass loosely through the fork and are threaded into the element 13. These bolts are locked by means of screws 17.

The disk or plate 18 is provided with an annular cut-away portion 19 cooperating with the shoulder 14 of the ring previously referred to. The disk 18 carries the wheel spindle 20, and connected with the inner side of the disk is a coiled spring 21, the point of connection being shown at 22. The opposite end of the spring is connected with the plate 24 at the point designated 23. The spring is therefore housed between the disk 18 and inner disk or plate 24. A lug 25 provides means for the connection of the steering devices with ring 13. The disk 18 is retained in the element 13 by means of the ring plate 27, the elements being so proportioned that the disk is freely rotatable. It is needless to add that the wheel spindle is eccentric with reference to the disk 18.

What is claimed:

1. In a device of the class described, a stationary member having an annular opening therein, a disk rotatable in the stationary member, a wheel spindle carried by the disk and a resilient device placed under tension by the rotation of the disk.

2. The combination with the fork of an axle, of an annular member fixed therein, and a disk rotatable within the annular member, a spring placed under tension by the rotation of the disk, and a wheel spindle carried by the disk.

3. In a device of the type described, a stationary member having an annular opening therein, a plurality of disk members entering said opening, one of the disks being rotatable, a spring having its ends connected respectively with the disks, and means for mounting a wheel on one of the disks and eccentrically with reference thereto.

4. In a device of the class described, a stationary member having an annular opening therein, a disk rotatable in the stationary member, a wheel spindle carried eccentrically by the disk, and a resilient device coiled within the stationary member and having one end connected with the disk and the other end secured in a fixed position.

5. In a device of the class described, a stationary member having an annular opening therein, the wall of the opening presenting a shoulder, a disk having a shouldered portion cooperating with the shoulder first named and abutting the latter, a wheel spindle carried eccentrically by the disk, and a resilient device placed under tension by the rotary movement of the disk within the stationary element.

In testimony whereof I affix my signature.

ALEX G. KEMERLING.